US012110222B2

(12) United States Patent
Gatti et al.

(10) Patent No.: US 12,110,222 B2
(45) Date of Patent: *Oct. 8, 2024

(54) DISPENSING DEVICE

(71) Applicant: LESAFFRE ET COMPAGNIE, Paris (FR)

(72) Inventors: Adrien Gatti, Lille (FR); Yves Gosselin, Allouagne (FR)

(73) Assignee: LESAFFRE ET COMPAGNIE, Paris (FR)

( * ) Notice: Subject to any disclaimer, the term of this patent is extended or adjusted under 35 U.S.C. 154(b) by 168 days.

This patent is subject to a terminal disclaimer.

(21) Appl. No.: 17/786,231

(22) PCT Filed: Dec. 17, 2020

(86) PCT No.: PCT/FR2020/052508
§ 371 (c)(1),
(2) Date: Jun. 16, 2022

(87) PCT Pub. No.: WO2021/123646
PCT Pub. Date: Jun. 24, 2021

(65) Prior Publication Data

US 2023/0028996 A1 Jan. 26, 2023

(30) Foreign Application Priority Data

Dec. 19, 2019 (FR) ...................................... 1915027

(51) Int. Cl.
*B67B 7/00* (2006.01)
*B08B 9/023* (2006.01)
(Continued)

(52) U.S. Cl.
CPC ................ *B67B 7/26* (2013.01); *B08B 9/023* (2013.01); *B08B 9/0321* (2013.01); *B26F 1/32* (2013.01);
(Continued)

(58) Field of Classification Search
CPC ................................ B67B 7/26; B65D 81/203
(Continued)

(56) References Cited

U.S. PATENT DOCUMENTS 4,776,488 A * 10/1988 Gurzan .............. B65D 75/5872 222/107
4,883,198 A * 11/1989 Manska ............. B65D 51/1677 222/1
(Continued)

FOREIGN PATENT DOCUMENTS

CN 101766846 A 7/2010
CN 102762182 A 10/2012
(Continued)

OTHER PUBLICATIONS

International Search Report for PCT/FR2020/052508, mailed Apr. 1, 2021, 5 pages.
(Continued)

*Primary Examiner* — Paul R Durand
*Assistant Examiner* — Michael J. Melaragno
(74) *Attorney, Agent, or Firm* — NIXON & VANDERHYE

(57) ABSTRACT

Disclosed is a manual pouring device or belonging, suitable for piercing and emptying a granular material contained in a vacuum-sealed package, including: a tubular body, having a duct for the flow of the material, extending from an inlet opening positioned at a first end of the tubular body to an outlet opening for the granular material, positioned at a second end of the tubular body; and a hollow piercing tool having a distal end ending in a pointed tip, and a widened base at the proximal end thereof, rigidly connected to the body. The device further includes a shoulder serving as a
(Continued)

stop, configured to come into contact with the wall of the package to stop the pouring device when the wall is pierced by the piercing tool.

14 Claims, 9 Drawing Sheets

(51) Int. Cl.
*B08B 9/032* (2006.01)
*B26F 1/32* (2006.01)
*B65D 25/48* (2006.01)
*B65D 81/20* (2006.01)

(52) U.S. Cl.
CPC ......... *B65D 25/48* (2013.01); *B65D 81/2023* (2013.01); *B08B 2209/032* (2013.01)

(58) Field of Classification Search
USPC ............................................................ 222/81
See application file for complete search history.

(56) References Cited

U.S. PATENT DOCUMENTS

| | | | | |
|---|---|---|---|---|
| 4,993,569 | A * | 2/1991 | Osip | B65D 51/224 215/250 |
| 5,325,995 | A * | 7/1994 | Harrison | B67B 7/26 222/81 |
| 5,405,053 | A * | 4/1995 | Zublin | B65B 69/0083 141/330 |
| 5,407,099 | A | 4/1995 | Heuke et al. | |
| 5,573,047 | A * | 11/1996 | Akin | B67D 3/0029 141/330 |
| 5,855,298 | A * | 1/1999 | Teetsel, III | B67B 7/26 222/88 |
| 6,089,406 | A | 7/2000 | Feldner | |
| 6,095,433 | A * | 8/2000 | Langdon | A01G 27/006 222/553 |
| 6,109,315 | A * | 8/2000 | Stern | B65D 77/06 141/330 |
| 6,223,940 | B1 * | 5/2001 | Quinn | B67B 7/26 222/89 |
| 7,708,164 | B2 * | 5/2010 | Pritchard | B65D 77/067 222/88 |
| 7,937,836 | B2 * | 5/2011 | Gabriel | B29C 45/1676 222/81 |
| 8,353,428 | B2 * | 1/2013 | Pritchard | G01F 11/08 222/105 |
| 8,627,975 | B1 * | 1/2014 | Whitbeck | B65D 35/32 220/254.1 |
| 2004/0238563 | A1 * | 12/2004 | Lin | B67B 7/44 222/192 |
| 2005/0077318 | A1 * | 4/2005 | Macler | B67D 3/0029 222/88 |
| 2005/0121464 | A1 * | 6/2005 | Miller | B65D 11/1873 222/81 |
| 2006/0249533 | A1 * | 11/2006 | Verespej | B65D 47/0814 222/153.01 |
| 2007/0205216 | A1 * | 9/2007 | Smith | B65D 77/067 222/81 |
| 2008/0257910 | A1 * | 10/2008 | Chang | B67B 7/28 222/105 |
| 2009/0206106 | A1 * | 8/2009 | Perez Ordonez | B67D 3/00 222/129 |
| 2009/0218370 | A1 * | 9/2009 | Michels | B67D 1/0004 222/85 |
| 2011/0017774 | A1 * | 1/2011 | Pritchard | G01F 11/08 222/207 |
| 2011/0031273 | A1 * | 2/2011 | Macler | B65D 25/48 222/1 |
| 2011/0152822 | A1 | 6/2011 | Drunk et al. | |
| 2011/0159225 | A1 * | 6/2011 | Boyle | C09J 133/06 428/41.8 |
| 2013/0144248 | A1 | 6/2013 | Putter et al. | |
| 2014/0048557 | A1 * | 2/2014 | Barron | B65D 75/5877 222/81 |
| 2014/0103065 | A1 * | 4/2014 | Lambrecht | B67D 1/0042 163/5 |
| 2019/0233187 | A1 | 8/2019 | Chen et al. | |
| 2021/0246342 | A1 * | 8/2021 | Jang | B32B 37/1284 |
| 2022/0064493 | A1 * | 3/2022 | Abe | C09J 7/38 |
| 2023/0028996 | A1 * | 1/2023 | Gatti | B08B 9/0321 |
| 2023/0105502 | A1 * | 4/2023 | Kikuchi | C09J 175/04 156/331.7 |
| 2023/0312320 | A1 | 10/2023 | Gatti et al. | |

FOREIGN PATENT DOCUMENTS

| | | |
|---|---|---|
| CN | 114829264 A | 7/2022 |
| EP | 0 421 538 | 4/1991 |
| EP | 1 201 598 | 5/2002 |
| EP | 1 228 979 | 8/2002 |
| FR | 1280014 | 12/1961 |
| FR | 1280014 A | 12/1961 |
| GB | 719054 | 11/1954 |
| GB | 2 457 041 | 8/2009 |
| TW | 200948408 A1 | 12/2009 |
| WO | 91/01923 | 2/1991 |

OTHER PUBLICATIONS

Written Opinion of the ISA for PCTFR2020/052508, mailed Apr. 1, 2021, 7 pages.
Office Action, issued in Chinese Patent Application No. 202080088248.1 dated Sep. 14, 2023.
Office Action, issued in Taiwanese Patent Application No. 109144454 dated Jun. 4, 2024.

* cited by examiner

DISPENSING DEVICE

CROSS-REFERENCE RELATED TO PRIORITY APPLICATIONS

This application is the U.S. national phase of International Application No. PCT/FR2020/052508 filed Dec. 17, 2020 which designated the U.S. and claims priority to FR Patent Application No. 1915027 filed Dec. 19, 2019, the entire contents of each of which are hereby incorporated by reference.

BACKGROUND OF THE INVENTION

Field of the Invention

The present invention relates to a pouring device having a particular application for piercing a container containing a granular material and emptying it, essentially by the phenomenon of gravity, possibly assisted by the user's movement when said pouring device is hand-operated. Alternatively, the pouring device may be attached to a production unit.

The present disclosure further relates to a package specially configured to cooperate with such a pouring device, avoiding handling errors, but also an equipment item comprising a pouring device and a package according to the disclosures herein.

The invention is more specifically concerned with the emptying of vacuum-sealed packages in which the granular material is compacted on account of the vacuum inside the package and the difference in pressure between the internal pressure of the package, which is lower than atmospheric pressure, and the atmospheric pressure outside the package.

The invention has a special, non-limiting, application in the aseptic transfer of a granular material such as yeast from a package, particularly a vacuum-sealed package, to an equipment item such as a fermentation tank, particularly in the field of beer production.

Description of the Related Art

The present disclosure relates to the field of vacuum-sealed packaging for dry granular material, such as dry yeast in powder form, and technical solutions offered for the aseptic transfer of the granular material contained in the packaging to a given equipment item.

In the field of beer production, it is very often necessary to add dry yeast in several of the production steps. For example, such an addition is done in order to implement fermentation in a tank, very often after cooling of a wort obtained by filtering a mixture of crushed cereal grains and water.

Active dry yeast is typically contained in a vacuum-sealed package in order to protect it from oxygen and moisture during storage. This package is opened for the purpose of manually pouring the contents thereof into a manhole in the fermentation tank. To the extent possible, this operation must be performed by aseptic means, otherwise germs, bacteria, or fungi may be transferred into the tank and could then develop during fermentation and degrade the organoleptic qualities of the beverage. In order to prevent germs from being transferred into the tank, the tools (such as a pair of scissors) used to open the package are disinfected, and the outside surfaces of the package may also be disinfected, before the vacuum-sealed package is pierced.

Once the vacuum-sealed package has been opened, the operator simply turns the package over above the manhole so that the yeast is poured onto the work in the fermentation tank.

According to the observations of the inventors, such a practice is not satisfactory, and this for several reasons:

- The disinfection of tools (such as pairs of scissors), typically done with a flame or with disinfecting solutions, is tedious and the success of the operation essentially depends on the operator's care in performing this operation,
- Manual pouring of the package over the manhole is often a tedious operation with a non-negligible risk of a harmful fall, for example a falling of the package into the tank, and above all,
- The opening of the manhole required for pouring in the yeast itself entails a risk of deteriorating the aseptic condition of the tank, because it allows a large quantity of non-sterilized air to enter the tank, with the potential risk of bacteria and fungi suspended in the air entering the tank, which could contaminate the wort.

Devices suitable for piercing and then emptying a package for the purpose of a hygienic product transfer are known from the prior art, such as for example as disclosed in the document EP 1201598. The device disclosed by EP 1201598 is intended to empty pouches of liquids, such as sauces or beverages, and implicitly requires the use of suction. This technical solution is neither effective nor functional for emptying a granular material from a vacuum-sealed package.

A device specially designed to empty a given quantity of a granular material (such as a fine powder, etc.) is also known, for example from the document GB 719054. This device comprises a piercing tool in the shape of an ogive used to pierce the wall of a container, until a shoulder provided at the base of the ogive comes into contact with the wall of the container. The piercing tool is hollow and has a lateral opening intended to be positioned entirely inside the container once the shoulder comes into contact with the wall. The lateral opening allows the material to be transferred into the body of the piercing tool, and then it flows to the base of the ogive toward an outlet hole. This device is designed to deliver a dose of material corresponding to the volume of the hollow portion each time the container is turned over.

In any event, and according to the inventors' observations, this device disclosed in GB 719054 is not capable of piercing and completely and quickly emptying the entirety of a package while it is kept in a generally vertical position, and especially in the case of a vacuum-sealed package.

SUMMARY OF THE INVENTION

The present disclosure improves this situation by proposing a pouring device having a particular application for piercing a vacuum-sealed package containing a granular material and emptying the container, essentially by the phenomenon of gravity, possibly while it is gently shaken and/or the flexible wall of the package is deformed, particularly when said device is hand-operated.

More specifically, the device has a particular application in completely and quickly emptying the granular material of a vacuum-sealed package while the device and package are in a generally vertical position, i.e. without the need to turn the package over.

Another purpose of the present disclosure is to propose such a device, a device configured for manual operation, that limits the risks of poor handling by the operator.

Another purpose of the present disclosure is to propose a production unit comprising a pouring device according to the present disclosure permanently mounted on the unit, configured for the aseptic transfer of a granular material contained in a vacuum-sealed package to an enclosure of the production unit.

Another purpose of the present disclosure is to propose a package specially configured to cooperate with a pouring device, particularly a manually-operated pouring device, according to the present disclosure or belonging to the production unit according to the present disclosure.

Another purpose of the present disclosure is to propose an assembly comprising a pouring device, as well as a package specially configured to cooperate with said piercing device according to the present disclosure, particularly one that is manually-operated or alternatively belongs to the production unit according to the present disclosure.

Other purposes and advantages will become clear from the description which follows, given for information purposes and not intended to limit the scope of the invention.

According to a first aspect, the present disclosure relates to a pouring device suitable for piercing and emptying a granular material contained in a package, particularly a vacuum-sealed package, comprising:

- a tubular body, having a duct for the flow of the material, extending from an inlet opening at a first end of the tubular body to an outlet opening for the granular material at a second end of the tubular body,
- a hollow piercing tool having a distal end coming to a pointed tip and a widened base at the proximal end thereof, rigidly connected to the tubular body at the first end of the tubular body, the piercing tool having at least one lateral opening along the length of the piercing tool, said lateral opening extending over the length of the piercing tool from the widened base of the piercing tool, said lateral opening being configured to allow the material to be poured from the outside to the inside of the hollow portion of the piercing tool, the hollow portion of the widened base of the piercing tool communicating with the inlet opening of the tubular body,
- a shoulder, serving as a peripheral stop, formed by the first end of the tubular body arranged around the widened base of the piercing tool, said shoulder serving as a stop being configured to come into contact with the wall of the package either directly or indirectly, to stop the pouring device when said wall is pierced by the piercing tool in a position wherein said lateral opening extends into the package and wherein said pouring device is configured to ensure the continuous emptying of the contents of the vacuum-sealed package when the pouring device is oriented vertically, the pointed tip pointing upward, the granular material flowing by gravity through said lateral opening via the inlet opening.

According to optional features of the manual pouring device, taken individually or in combination:

- the piercing tool having a longitudinal axis, said shoulder having a flat surface substantially perpendicular to said longitudinal axis, configured to serve as a bonding surface with an adhesive on the outside wall of the package;
- the flat surface serving as a bonding surface has a surface area usable for bonding of between 3 $cm^2$ and 50 $cm^2$, for example between 5 $cm^2$ and 50 $cm^2$, for example between 3 $cm^2$ and 10 $cm^2$, or between 10 $cm^2$ and 35 $cm^2$;
- the surface usable for bonding is ring-shaped and is defined between an outer radius and an inner radius;
- the difference in radius $\Delta R$ between the outer radius and the inner radius is between 2 mm and 20 mm;
- the tubular body has a longitudinal axis that is substantially the same as the longitudinal axis of the piercing tool,
- said pouring device being manual, the tubular body has dimensions configured to form a hand grip;
- the useful length of the tubular body serving as a handle is between 5 cm and 15 cm, for example between 6 cm and 10 cm, such as 7 cm;
- the outside diameter of the useful surface forming a grip handle is between 2 cm and 5 cm, such as 2.5 cm;
- the device has a wrist strap, rigidly connected to the grip handle, intended to have the user's wrist passed through it when the user's hand grips the grip handle;
- the pouring device essentially consists of a single part made of plastic material forming the piercing tool and the tubular body, including the shoulder.

According to an advantageous embodiment, in particular for emptying small-size packages, the piercing tool comprises a widened base having, in a plane perpendicular to the longitudinal axis of the piercing tool, a longer dimension in a first direction, and having in a second, substantially perpendicular, direction a shorter dimension, and wherein the useful surface for bonding extends along the trajectory of an oval consisting of a closed curve elongated in the first direction and narrow in the second direction.

According to a second aspect, the present disclosure further relates to a production unit comprising an enclosure as well as a pouring device according to the present disclosure, rigidly mounted on the enclosure or a pipe of said production unit, the piercing tool being vertical, the pointed tip pointing upward, said pouring device being configured to transfer a granular material contained in a vacuum-sealed package to the enclosure, directly into said enclosure or indirectly via said pipe.

According to one embodiment of the production unit, the tubular body of the pouring device is sealingly and rigidly connected to said enclosure so that the outlet opening communicates with the inside volume of said enclosure, said pouring device in the upper portion of said enclosure, configured so that the granular material flows from the outlet opening to the inside of said enclosure (by gravity).

According to one embodiment of the production unit, said enclosure being force-fed with product by the pipe, said tubular body of the pouring device is sealingly coupled to the pipe either directly or indirectly, via a transfer system so that the granular material flows into the pipe while being mixed with the products, before said granular material is routed to said enclosure together with the products. For example, the production unit is a fermentation unit and said enclosure is a fermentation tank.

According to a third aspect, the present disclosure relates to a package containing a granular material, comprising on the outer surface of the wall thereof an aseptic or sterile adhesive, isolated from external contamination by a peelable sheet intended to be removed for the package is pierced, the adhesive being configured to bond to the shoulder of a pouring device according to the present disclosure when the piercing tool pierces the wall of the package. The pouring device can be configured to be manual or alternatively can be permanently installed on the production unit.

According to optional features of the package, taken individually or in combination:

- the adhesive is a double-sided adhesive having a first adhesive surface adhering to the wall of the package and a second adhesive surface covered by the peelable sheet, configured to bond to the bonding surface of said shoulder of a pouring device according to the present disclosure;
- the adhesive has a hole through which the piercing tool is intended to pass when the tool pierces the wall of the package;
- the adhesive has an annular or oval shape;
- the double-sided adhesive has a thickness separating the first adhesive side and the second adhesive side of between 0.5 mm and 2 mm, such as for example 0.6 mm, 1.1 mm, or 1.6 mm, the double-sided adhesive being flexible in the thickness thereof,
- the double-sided adhesive comprises a flexible substrate for an adhesive composition, and an adhesive composition covering the substrate, the substrate being alveolar, formed by a closed-cell foam,
- the granular material is in a vacuum in the package.

According to a fourth aspect, the present disclosure further relates to an assembly comprising not only a manual pouring device but also a package according to the present disclosures.

According to one embodiment of said combination, said assembly comprises a manual pouring device according to the present disclosure, the adhesive of the package being bonded to the shoulder of the pouring device when the wall of the package is pierced by the piercing tool thereby forming an adhesive bond, the adhesive bond between the shoulder and the adhesive being configured to allow the operator to hold the assembly solely by the handle of the pouring device, of which the pointed tip of the piercing tool is pointing downward, the package containing the granular material then suspended to the pouring device solely by the bonding force of the adhesive bond.

According to a fifth aspect, the present disclosure further relates to an equipment item comprising a pouring device according to the disclosure, or a pouring device of a fermentation unit according to the present disclosure, as well as a cover sealingly cooperating with the first end of the tubular body, covering the piercing tool, forming a sealed chamber for a fluid, said chamber being defined between the cover, on the one hand, and the piercing tool and the shoulder, on the other hand, said sealed chamber communicating with the duct of the tubular body via said at least one lateral opening.

The present disclosure further relates to a method for cleaning and disinfecting the inside surfaces of the piercing tool and of the duct of the tubular body and the outside surfaces of the piercing tool and the shoulder of the pouring device of an equipment item according to the disclosure, wherein:

- the cover is put in place covering the piercing tool and said shoulder thereby forming a sealed chamber for a fluid, said chamber being defined between the cover, on the one hand, and the piercing tool and said shoulder, on the other hand, said sealed chamber communicating with the duct of the tubular body via said lateral opening,
- a disinfectant fluid is injected through the outlet opening so that the disinfectant fluid flows, on the one hand, into the duct and the hollow portion of the piercing tool and comes into contact with the inside walls of the duct and the hollow portion of the piercing tool, and flows, on the other hand, into the sealed chamber and comes into contact with the outside walls of the piercing tool and the shoulder.

According to one embodiment, the step for disinfectant fluid injection that disinfects the inside surfaces of the piercing tool and the duct of the tubular body of the pouring device, and the outside surfaces of the piercing tool and the shoulder, is an injection that simultaneously cleans the inside surfaces of the production unit.

BRIEF DESCRIPTION OF THE DRAWINGS

Other features, details and advantages will become clear from the following detailed description and the analysis of the appended drawings, wherein:

FIG. 3*a* is a detail view of the adhesive of the package in FIG. 3 with the first adhesive side thereof bonded to the wall of the package, the second adhesive side covered by said peelable sheet, and the central hole intended to allow the piercing tool of the manual pouring device to pass through.

DESCRIPTION OF THE PREFERRED EMBODIMENTS

The invention relates to a pouring device 1 suitable for piercing and emptying a granular material contained in a package P and particularly a vacuum-sealed package.

The granular material is preferably dry, such as an active dry yeast intended for the implementation of fermentation, such as for beer production. The granular material is contained in a package that is preferably vacuum-sealed. The material and the package are compacted due to the vacuum and the difference in pressure between the inside pressure, which is less than atmospheric pressure, and the outside pressure, that is, atmospheric pressure.

According to the preliminary tests conducted by the inventors, pouring devices operating by the piercing of a package to empty liquids or a granular material from a conventional package (without a vacuum), such as those known from the prior art disclosed, for example, in GB 719054, are not satisfactory for emptying a compacted granular material from a vacuum-sealed package. When these devices are used with such a vacuum-sealed package, the granular material starts to empty before the flow quickly runs dry. These pouring devices do not make it possible to quickly empty the granular contents of the package.

The invention arose from the inventors' observation that the pouring devices of the prior art, when used to pierce and empty a vacuum-sealed package, cause a partial vacuum during the flow of the material which may maintain the vacuum inside the package, a vacuum which opposes the flow of the granular material. In other words, the air needed to empty the granular contents, flowing in the opposite direction of the flow, may cause refluxes resulting in a loss of product, which escapes the device at the piercing location.

The inventors have responded to this problem by designing a pouring device which, when configured to be manual and at least according to one embodiment, will make it possible to pierce the package and be handled easily by the operator, for example by shaking the pouring device and pierced package assembly during the emptying operations, or by deforming the flexible wall of the package to promote the flow, for example above a manhole in a fermentation tank, and preferably while limiting the risks of poor handling and inadvertent dropping.

Advantageously, such a device thus makes it possible to empty all of the granular material contained in the package, particularly the vacuum-sealed package, quickly and, in particular, continuously.

If, according to one embodiment, the pouring device is rigidly connected to and permanently mounted on a production unit, the pouring device can advantageously transfer aseptically the granular material contained in a vacuum-sealed package to an enclosure of the production unit.

Figure 1:
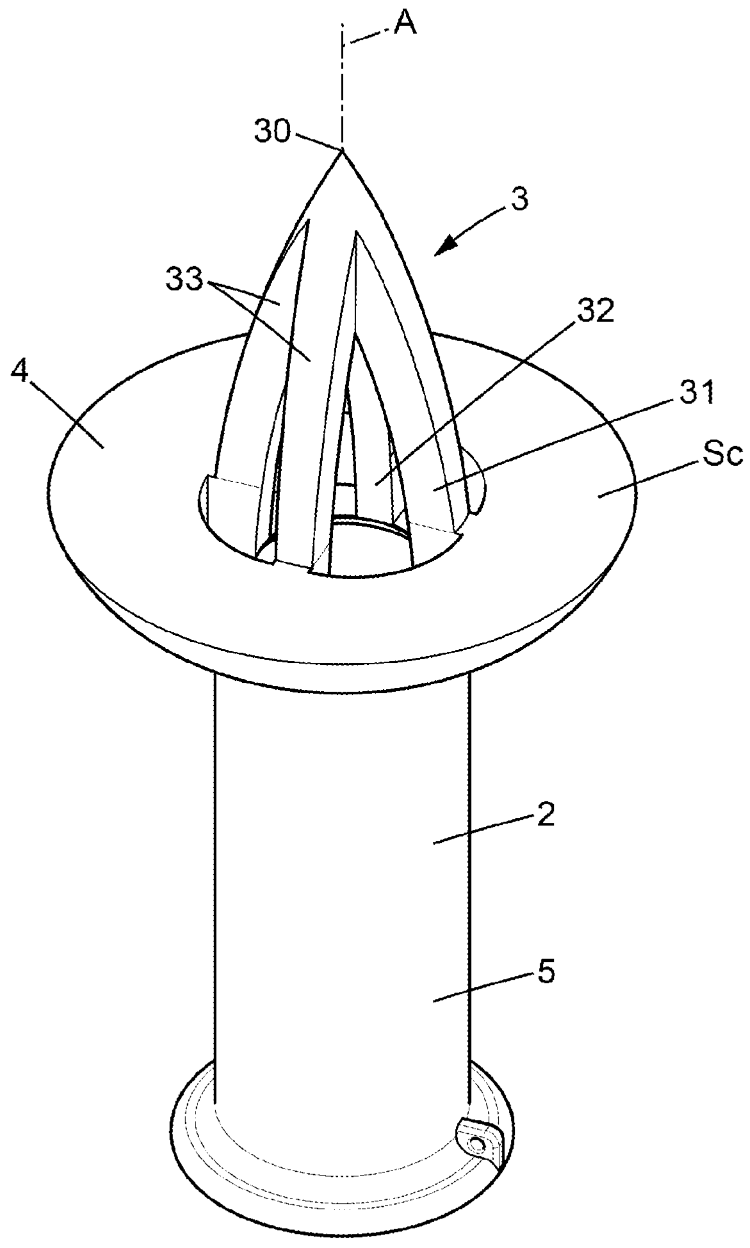
FIG. 1 is a perspective view of a manual pouring device according to one embodiment.
Figure 2:
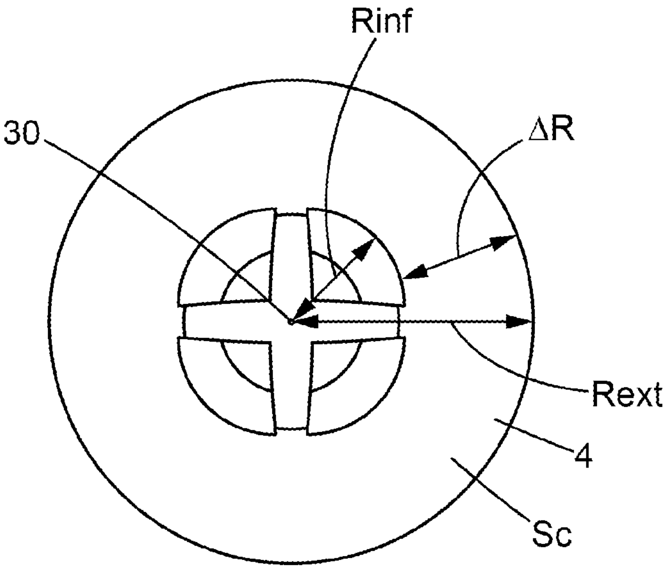
FIG. 2 is a top view of the device as illustrated in FIG. 1.
Figure 3:
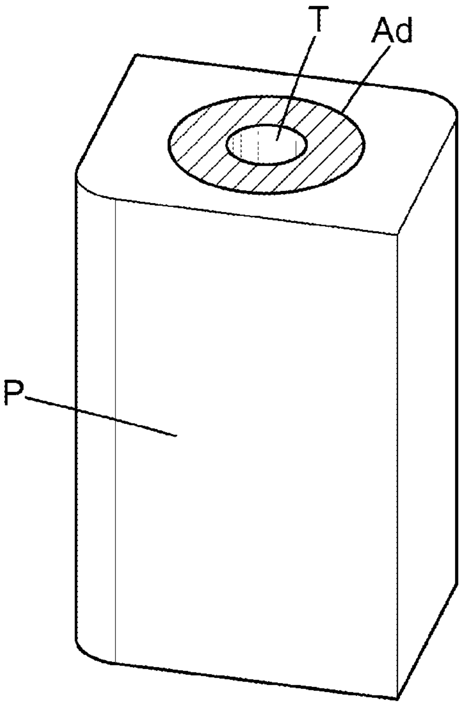
FIG. 3 is a view of a package, particularly a vacuum-sealed package, according to one embodiment of the present disclosure
Figure 3A:
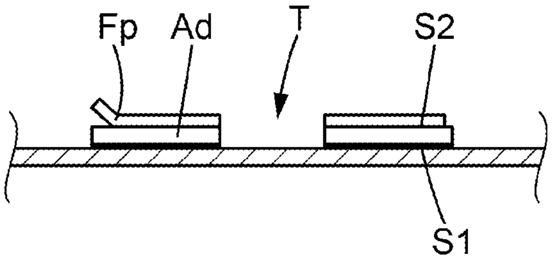

Also, as shown in FIGS. 1 and 2 as non-limiting examples, the pouring device 1 is configured to be manual and is suitable for piercing and emptying a granular material contained in a package P, particularly a vacuum-sealed package.

Generally, the pouring device 1 configured (to be manual or not) comprises:

- a tubular body 2, having a duct 20 for the flow of the material, extending from an inlet opening 21 positioned at a first end of the tubular body to an outlet opening 22 for the granular material, positioned at a second end of the tubular body 2,
- a hollow piercing tool 3 having a distal end ending in a pointed tip 30 and a widened base 31 at the proximal end thereof, rigidly connected to the tubular body at the first end of the tubular body, the piercing tool having at least one lateral opening 32 along the length of the piercing tool, said lateral opening 32 along the length of the piercing tool from the widened base 31 of the piercing tool, said lateral opening being configured to allow the material to be poured from the outside to the inside of the hollow portion of the piercing tool 3, the hollow portion of the widened base 31 of the piercing tool 3 communicating with the inlet opening 21 of the tubular body 2,
- a shoulder 4 serving as a peripheral stop, formed by the first end of the tubular body 2 arranged around the widened base 31 of the piercing tool, said shoulder 4 serving as a stop being configured to come into contact with the wall of the package to stop the pouring device when said wall is pierced by the piercing tool 3.

Generally, it is noted that the longitudinal axis A of the piercing tool and the longitudinal axis of the duct 20 are preferably substantially the same, the duct 20 extending the piercing tool vertically when the piercing tool is oriented vertically, the pointed tip 30 pointing upward.

Generally, it is noted that the piercing tool can comprise a plurality of lateral openings 32 distributed around the axis A of the piercing tool and, for example, with four each opening extends over an angular sector, particularly less than 90°.

The piercing tool 3 can have the shape of an ogive comprising ogive arches 33, each of which extending from the widened base 31 of the piercing tool 3 to the pointed tip 30 of the piercing tool where the ogive arches 33 meet. Said at least one lateral opening 32 can comprise a plurality of lateral openings 32. Each lateral opening 32 preferably extends from the widened base 31 between two consecutive ogive arches 33 over the entire length or a portion of the length of the piercing tool toward the pointed tip 30. As an example, there are four of the ogive arches 33 distributed around the axis A, for example every 90°.

Figure 4:
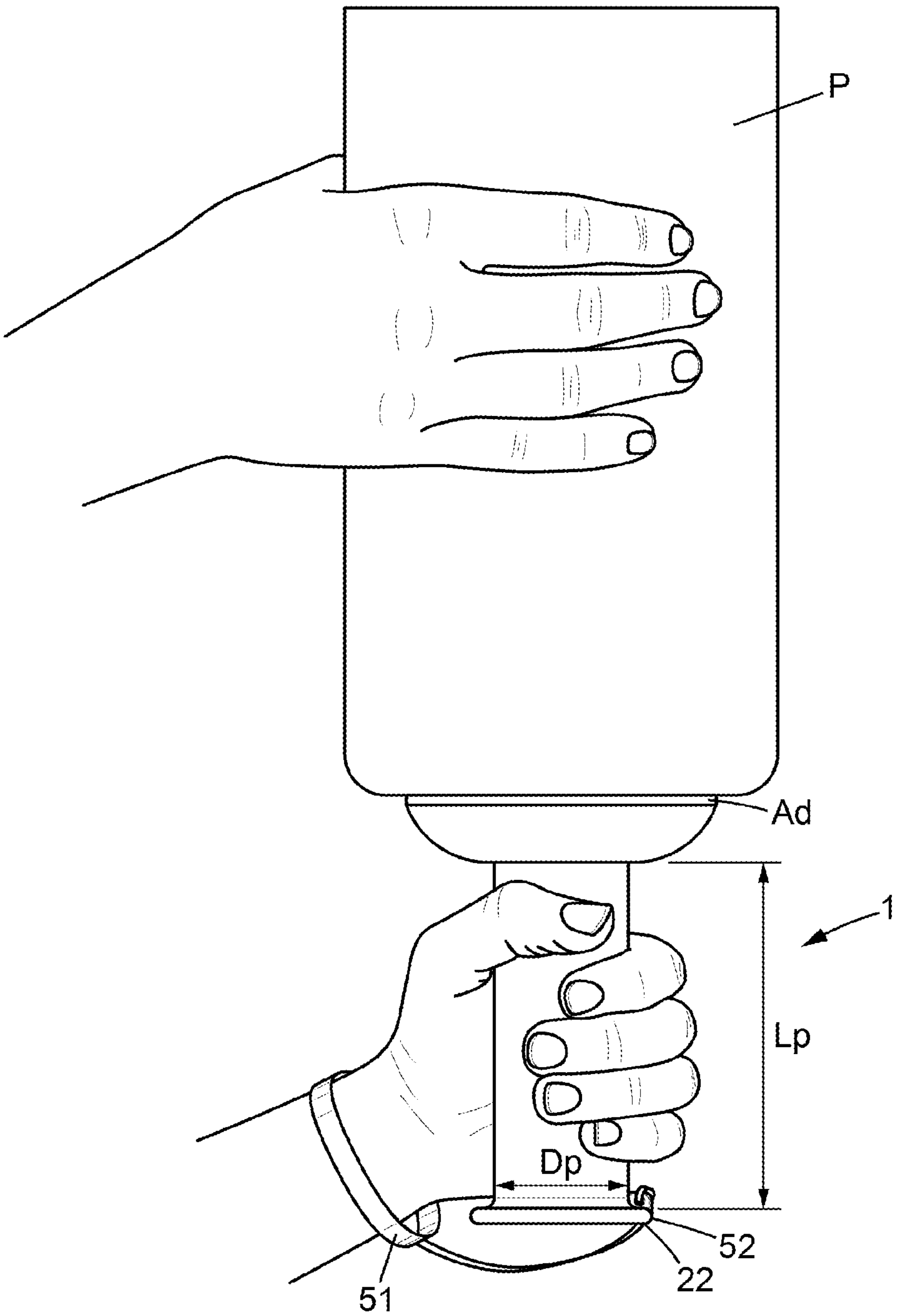
FIG. 4 is a schematic view of the device in FIG. 1 when the device is used by an operator to pierce and empty the granular contents of the package according to FIG. 3, the bonding surface of the shoulder being bonded to the annular-shaped adhesive of said packaging.
Figure 5:
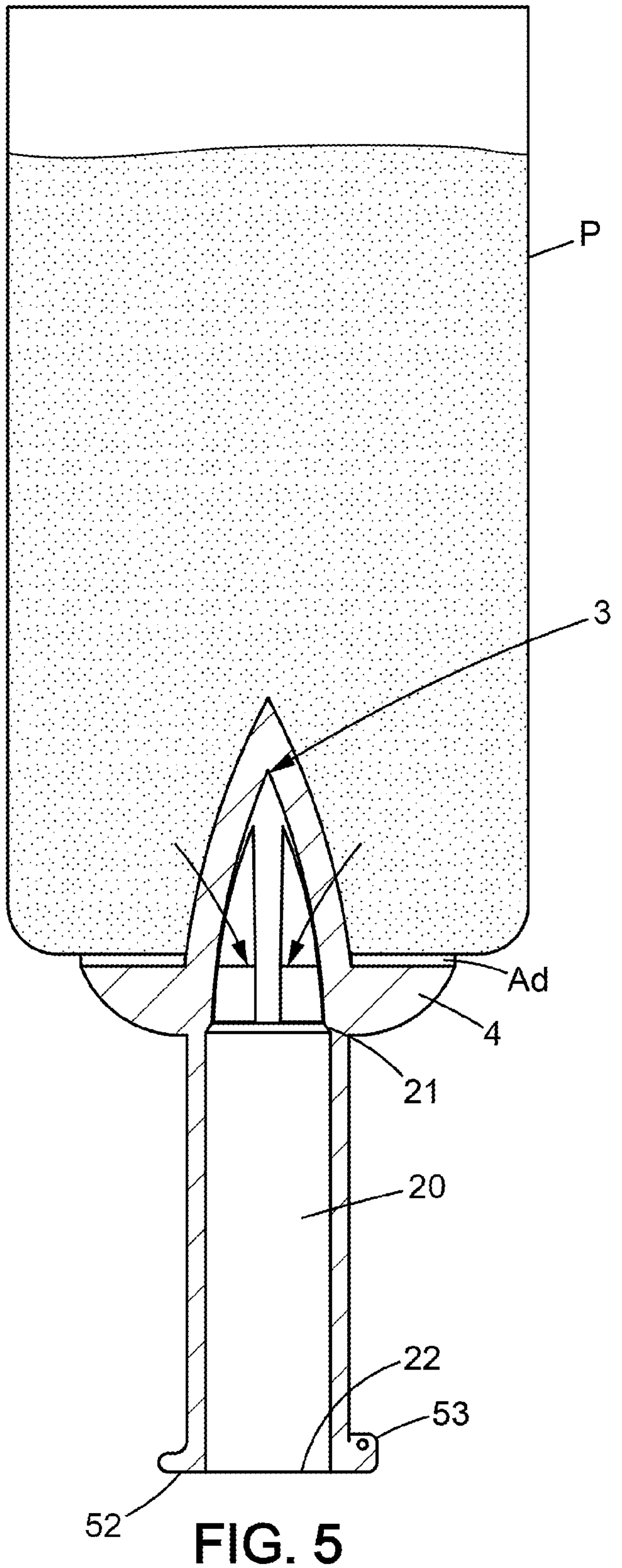
FIG. 5 is a cross-sectional view of FIG. 4 (operator's hand not shown).
Figure 6:
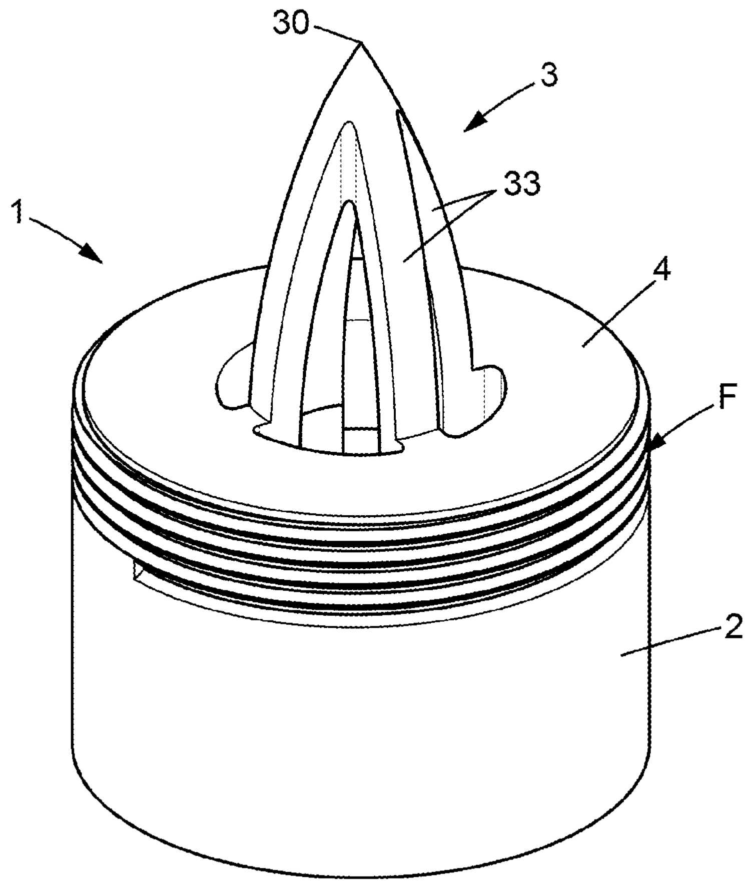
FIG. 6 is a perspective view of a pouring device according to a second embodiment, configured to be permanently and sealingly mounted on a production unit.
Figure 7:
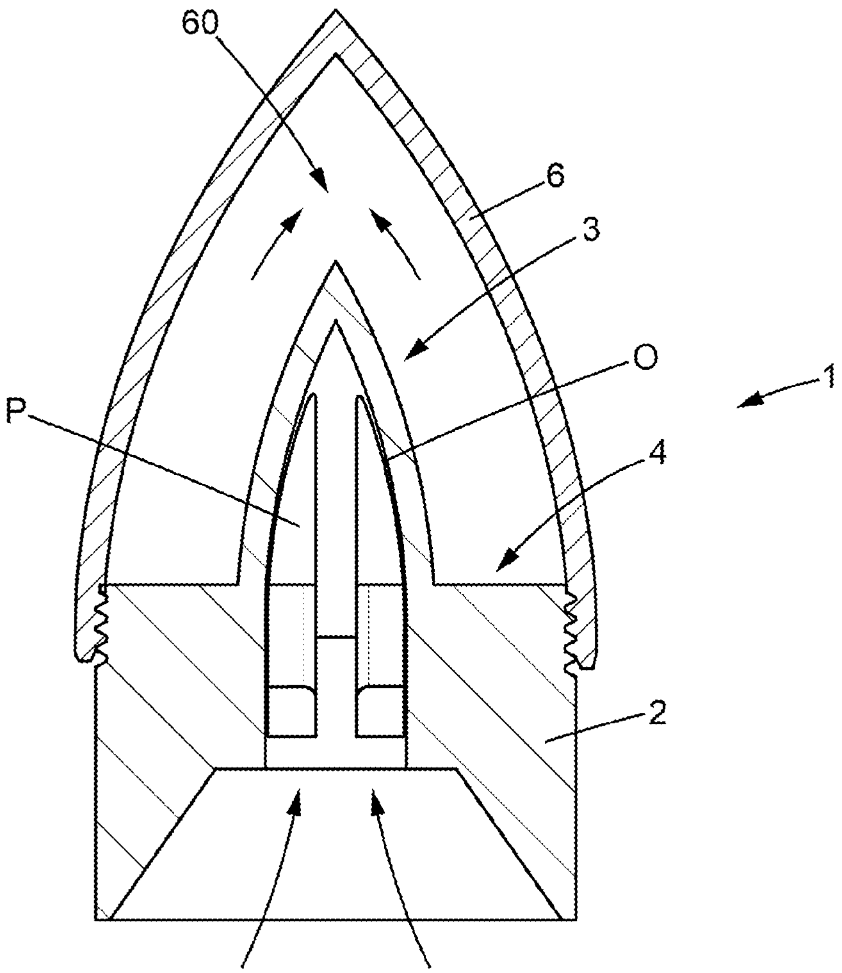
FIG. 7 is a cross section of the device in FIG. 6, to which is added a cover by threading onto the threads of the body of the pouring device.
Figure 8:
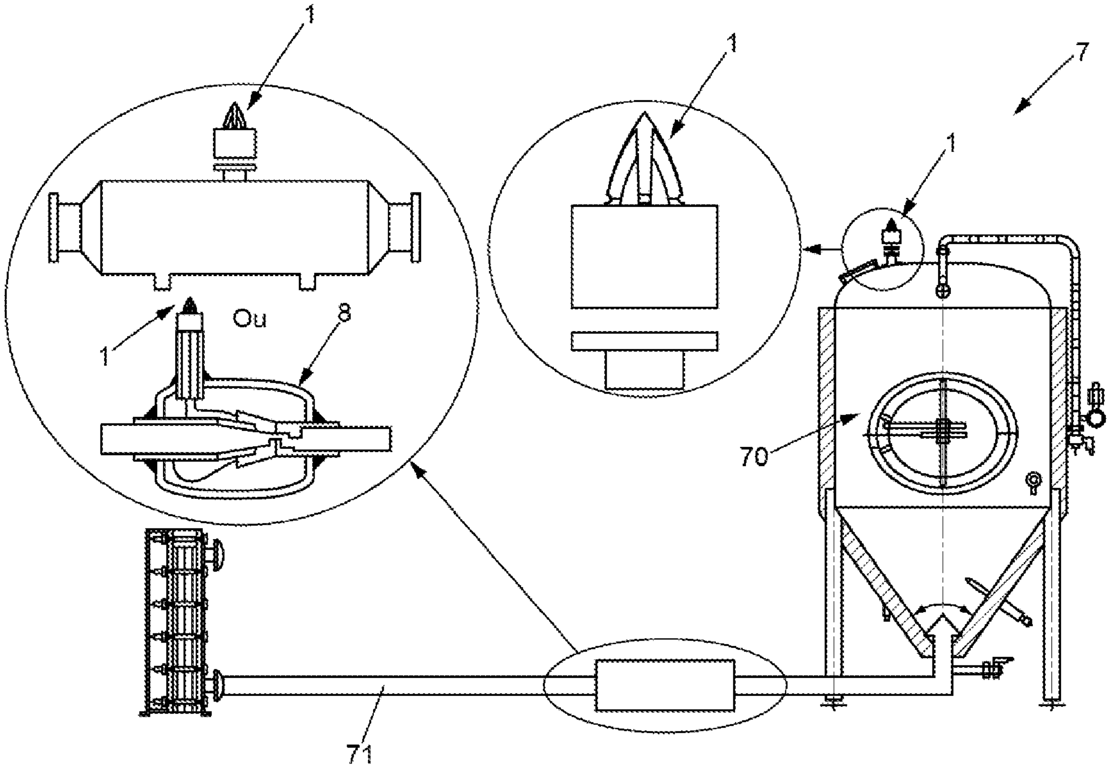
FIG. 8 is a schematic view showing a plurality of possible integrations of a pouring device according to FIG. 6 permanently mounted on a fermentation unit.

Thus, as shown in FIG. 4 and in the manual configuration thereof, such a pouring device is used by piercing the wall of the package by means of the piercing tool until the shoulder 4 stops against the outer surface of the wall of the package. Pouring occurs when the device is held in a position wherein the axis of the piercing tool is substantially vertical and the pointed tip 30 is pointing upward; the granular material flows from the package, through said lateral opening in the hollow portion of the piercing tool 3, through the inlet opening 21, and to the outlet opening 22 where the granular material escapes.

During this emptying operation, the operator holds the package with one hand and the pouring device with the other hand, and can deform the package and even shake the pouring device and package P assembly to promote flow, particularly in the case of a vacuum-sealed package.

The manual pouring device has a particular application in the aseptic transfer of dry beer yeast into a fermentation tank. In particular for this reason, and to avoid any risk of objects (package and/or pouring device) falling into the fermentation tank with the associated contamination risks, the pouring device and/or the package itself can have certain advantageous provisions.

Thus, said shoulder 4 can first of all have a flat surface substantially perpendicular to said longitudinal axis, configured to serve as a bonding surface Sc for bonding to the outside wall of the package with an adhesive. In such a case, the package P containing the granular material may advantageously include an aseptic or even sterile adhesive Ad on the outer surface of the wall thereof; isolated and protected from external contamination by a peelable sheet Fp. This peelable sheet Fp is intended to be removed before piercing. Once the peelable sheet Fp has been removed, the adhesive is configured to bond to the shoulder 4 of the pouring device when the piercing tool pierces the wall of the package.

The adhesive Ad can be a double-sided adhesive having a first adhesive side S1 bonded (pre-attached) to the wall of the package and a second adhesive side S2 covered by the peelable sheet Fp serving as protection for the second adhesive surface. Once the peelable sheet has been removed, the second adhesive surface is configured to bond to the bonding surface Sc of the shoulder to hold the pouring device on the package. For example: the double-sided adhesive can be a double-sided silicone adhesive. This adhesive can be positioned at one of the longitudinal ends of the package when the package has a direction with a longer length, as shown in the figures. Advantageously, the adhesive further avoids refluxes of granular material by making a 360° seal between the shoulder 4 and the adhesive around the piercing device, and thus advantageously prevents leaks of product at the piercing hole in the package.

The double-sided adhesive may have a thickness separating the first adhesive side and the second adhesive side of between 0.5 mm and 2 mm, such as for example 0.6 mm, 1.1 mm, or 1.6 mm. Such a thickness, combined with the fact that the adhesive is flexible (in the thickness thereof), provides a seal between the package and the bonding surface of the device, advantageously compensating for the unevenness of the package wall in contact with the first side of the adhesive. The unevenness may consist of a fold (folds) or furrow in the package wall.

The double-sided adhesive can thus comprise a flexible substrate with an adhesive composition, for example alveolar, such as a foam preferably with closed cells. For example, the foam may be acrylic. The adhesive composition covering the substrate can be acrylic.

The flat surface serving as a bonding surface Sc can have a surface area usable for bonding of between 3 $cm^2$ and 50 $cm^5$, for example between 5 $cm^2$ and 50 $cm^2$, for example between 10 $cm^2$ and 35 $cm^2$, such as, for example, on the order of 20 $cm^2$. The surface area may further be between 3 $cm^2$ and 10 $cm^2$. The bonding surface is a determinant parameter for the bonding strength of the adhesive bond between the package and the pouring device. However, it is possible to decrease the bonding surface and achieve the same bonding strength, depending on the type of adhesive chosen (and the bonding strength thereof), by selecting an adhesive composition with a higher adhesive strength.

The surface area usable for bonding can have an annular shape defined between an outer radius Rext and an inner radius Rint. The difference in radius ΔR between the outer radius Rext and the inner radius Rint is between 2 mm and 30 mm, for example between 2 mm and 10 mm, or between 10 mm and 20 mm.

The adhesive Ad can have a hole T through which the piercing tool is intended to pass when the tool pierces the wall of the package. This hole has a diameter at least equal to the diameter of the widened base 31 of the piercing tool. The adhesive Ad can have an annular shape and the adhesive is preferably sized to the dimensions of the bonding surface Sc formed by the shoulder 4: In the case of an annular adhesive, it can have the same inner radius and the same outer radius as the flat useful surface of the shoulder serving as bonding surface Sc.

According to one possible alternative (not shown), it is also possible to put the (pre-attached) adhesive on the shoulder 4 of the piercing device instead of on the package.

As shown in FIG. 4, and generally whenever the device is configured to be manual, the tubular body 2 can advantageously have dimensions configured to form a grip handle 5. The useful length Lp of the tubular body serving as a handle can be between 5 cm and 15 cm, for example between 6 cm and 10 cm, such as 7 cm, i.e. a length approximately corresponding to a width of a human palm. The outside diameter Dp of the useful surface forming a grip handle can be between 2 cm and 5 cm, such as 2.5 cm. Note that the handle can have a peripheral rim 53 protruding radially to the outside at the outlet opening 22.

According to one embodiment, said device can have a wrist strap 51, particularly in the form of a strap, rigidly connected to the grip handle 5, through which the user's hand is intended to pass when the hand grips the grip handle 5. An attachment eyelet 52 integral to the tubular body 2 can allow for attachment of the wrist strap 51. This wrist strap provides additional safety against the risks of loss and dropping during the emptying operations, particularly in the event that the operator shakes the package/pouring device assembly during the operations.

According to one embodiment, the pouring device can essentially consist of a single integral part made of plastic material forming the piercing tool and the tubular body (including the shoulder and possible grip handle), including the shoulder. According to another possible embodiment, the device is the result of the assembly of a plurality of parts. The single integral part of the pouring device (or the various parts of said device) can be made by additive manufacturing, such as 3D printing, or injection molding.

According to another possibility, the pouring device can be an integral part of a production unit, permanently mounted on the production unit, the pointed tip of the piercing tool pointing upward.

According to one embodiment, shown in particular in FIG. 10, the cross-section of the ogive arches 33 can advantageously be beveled, each ogive arch thus having a ridge 330, particularly sharp, formed between two sloped surfaces 331, 332 of the bevel, said ridge oriented radially to the outside. The angle between the two sloped surface 330, 331 can be 90° or less than 90°, that is, an acute angle. Such beveled ogive arches provide for controlled piercing of the package wall when the piercing tool passes through the package wall, thereby avoiding uncontrolled tearing thanks to the bevels: the risks of leaking due to an undesired tear of the package when the piercing tool passes through the wall thereof are avoided.

According to one embodiment shown in FIG. 10, the piercing tool can have a widened base 31 having, in a plane perpendicular to the longitudinal axis of the tool, a longer dimension in a first direction d1, and in a second direction d2 in the same plane, substantially perpendicular, a shorter dimension. The surface area usable for bonding the shoulder 4 then preferably extends along the trajectory of an oval consisting of a closed curve elongated in the first direction dl and narrow in the second direction d2 in the vicinity of the widened base. The width of the bonding surface in the radial direction can be between 2 mm and 20 mm.

Such a shape of the piercing tool and of the bonding surface makes it possible to advantageously limit the useful dimension of the device in the second direction d2, and compared to the embodiments wherein the widened base extends according to a same radius in the plane perpendicular to the longitudinal axis of the piercing tool, and advantageously without diminishing the emptying performance.

Figure 9:
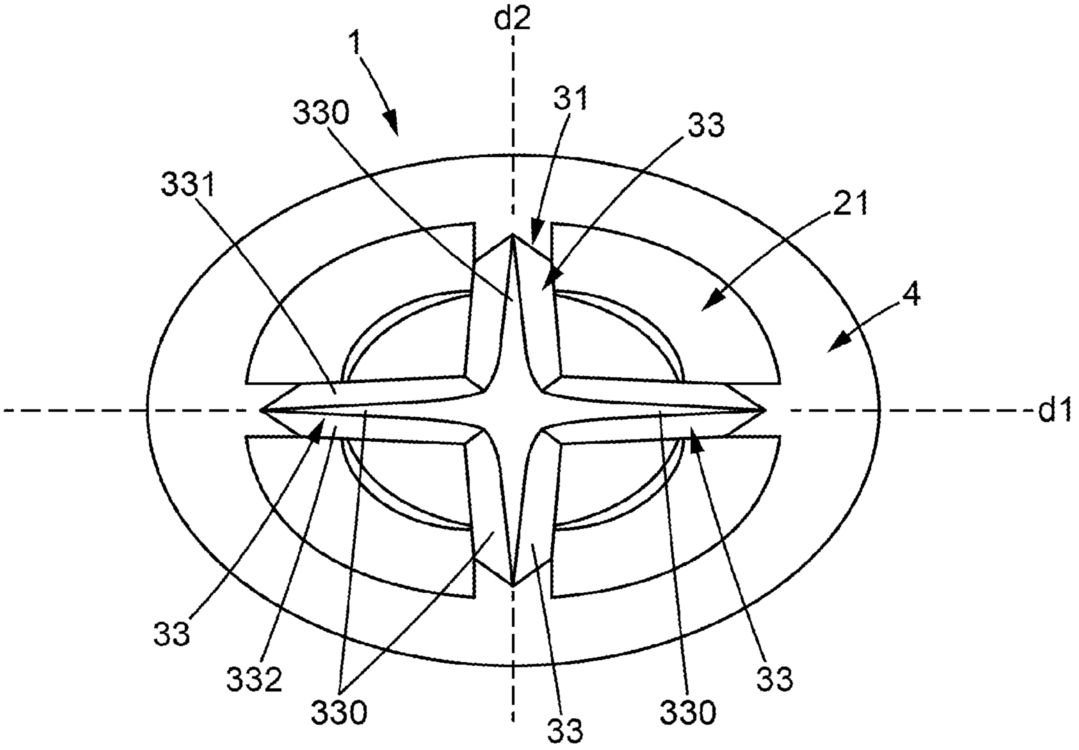
FIG. 9 is a top view of a variant of the device as shown in FIG. 1, for which each of the ogive arches of the piercing tool has a beveled cross-section and wherein the piercing tool has a widened base with, in a plane perpendicular to the longitudinal axis thereof, a longer dimension in a first direction, and in a second, substantially perpendicular, direction has a shorter dimension, and wherein the useful surface for bonding extends along the trajectory of an oval consisting of a closed curve elongated in the first direction and narrow in the second direction.

Consequently, the adhesive of the package can have an oval shape with this design shown in FIG. 9, and not an annular shape as in the embodiments of the device in FIGS. 1 and 2. The dimension of the adhesive in the narrow dimension thereof is then less than the diameter of the adhesive having an annular shape, which facilitates implementation for packages, particularly small packages.

Also, the present disclosure further relates to a production unit 7 such as a fermentation unit comprising an enclosure 70 such as a fermentation tank, as well as a pouring device 1 according to the invention, rigidly connected to said enclosure 70 or to a pipe 71 of said production unit, the piercing tool oriented vertically, the pointed tip pointing upward, said pouring device being configured to transfer a granular material contained in a vacuum-sealed package to said enclosure 70, directly into said enclosure or indirectly via said pipe 71.

To that end, the second end of the tubular body is sealingly secured to said enclosure 70, particularly to the fermentation tank or to the pipe, for example by means of an internal thread 23 (or thread) at the outlet opening 22 engaging by screwing with a threaded coupling of the production unit. Any other type of coupling can be used to attach the second end to the tank or to the pipe, such as a coupling according to the SMS standard or a coupling known to a person skilled in the art by the name of "CLAMP coupling."

According to one embodiment, the tubular body of the pouring device is rigidly and sealingly connected to said enclosure 70 so that the outlet opening 22 communicates with the inside volume of the enclosure, and particularly the fermentation tank. The pouring device is secured in the upper portion of the enclosure, particularly of the tank, and is configured so that the granular material flows from the outlet opening 22 to the inside of said tank 70, particularly the tank, by gravity.

According to another possibility, said enclosure 70, particularly the fermentation tank 70, being force-fed with product by the pipe 71, said tubular body of the pouring device is sealingly coupled to the pipe 71 directly or indirectly via a transfer system so that the granular material flows into the pipe 71 while mixing with the products, and before said granular material is routed to said enclosure 70 together with the products.

For example, one can use a transfer system such as a venturi 8, through which the fluid in the pipe passes, the partial vacuum generated by the venturi 8 sucking the granular material so as to mix it with the fluid downstream of the venturi.

The present disclosure further relates to an equipment item comprising a pouring device 1 according to the present disclosure, or a pouring device of a production unit 7 according to the present disclosure, as well as a cover 6 sealingly cooperating with the first end of the tubular body, covering (in the closed position) the piercing tool 3 and the shoulder 4, forming a sealed chamber 60 for a fluid.

Said chamber is defined between the inside wall of the cover 6, on the one hand, and the piercing tool 3 and the shoulder 4, on the other hand, said sealed chamber communicating with the duct 20 of the tubular body via said at least one lateral opening. Such a cover 6, in addition to the function thereof as a component for closing the inlet opening, can advantageously make it possible to implement a cleaning and disinfecting method. The cover 6 can be screwed onto the tubular body, the cover having an inside thread engaging with an outside thread F of the tubular body at the first end of the tubular body. Alternatively, the cover 6 can be attached to the tubular body of the device by any type of coupling, such as an SMS coupling or a CLAMP coupling.

Also, the invention further relates to a method for cleaning and disinfecting the inside surfaces of the piercing tool and of the duct of the tubular body of the pouring device 1 and of the outside surfaces of the piercing tool, of the shoulder of the pouring device of an equipment item according to the present disclosure.

This cleaning and disinfecting method comprises the following steps:

- the cover 6 is put in place covering the piercing tool and said shoulder 4, thereby forming a sealed chamber 60 for a fluid, said chamber being defined between the cover, on the one hand, and the piercing tool 3 and said shoulder 4, on the other hand, said sealed chamber communicating with the duct 20 of the tubular body via said one lateral opening 32,
- a disinfectant fluid is injected through the outlet opening 22 so that the disinfectant fluid flows, on the one hand, into the duct 20 and the hollow portion of the piercing tool and comes into contact with the inside walls of the duct 20 and of the hollow portion of the piercing tool 3, and flows, on the other hand, into the sealed chamber 60 and comes into contact with the outside walls of the piercing tool 3 and of the shoulder 4.

The present disclosure further relates to a package as such, as previously described with the aseptic or sterile adhesive Ad, isolated from external contamination by a peelable sheet Fp, intended to be removed prior to piercing of the package, the adhesive being configured to bond to the shoulder 4 of a manual pouring device according to the present disclosure when the piercing tool pierces the package wall, or to the shoulder 4 of a pouring device permanently mounted on the production unit.

In the latter case in which the adhesive makes a 360° bond to the shoulder around the piercing tool of a pouring device belonging to a production unit, there is the further advantage, in addition to preventing leaks of granular products, of preventing the introduction of potentially non-sterile outside air to the material flowing in the production unit.

The present disclosure further relates to an assembly comprising a pouring device according to the present disclosure and such a package according to the present disclosure. The adhesive of the package is configured to make a 360° bond to the bonding surface around the piercing tool of the pouring device, forming an adhesive connection between the package and the pouring device. This adhesive connection ensures a good seal by preventing leaks of material between the package and the pouring device during emptying.

If the pouring device is a manual device (in particular if the tubular body 2 has dimensions designed to form a grip handle 5 for the hand), this adhesive bond between the pouring device and the package provides further safety for the operations of pouring the contents of the package by the operator. The risks of the package and/or the pouring device falling, particularly into a fermentation tank, are avoided.

Such an adhesive bond makes it possible in particular, at the end of emptying the package, to deform the wall of the package with both hands in order to expel the last portions of granular material through the pouring device, and therefore without requiring the pouring device to be held by the handle which is then suspended from the package by the adhesive bond between the package and said device, the outlet opening 22 then being oriented downward.

Preferably, and conversely, the adhesive bond can further be advantageously configured to allow the operator to hold the assembly solely by the handle of the pouring device, the pointed tip of which is oriented downward, the package containing the granular material being suspended solely by the adhesive bond.

In this case the bonding strength of the adhesive bond is therefore at least equal to (or preferably greater than) the force exerted on the package by gravity and therefore the weight of the package containing the granular material. The weight to be considered here is the weight of the package before it has been pierced by the pointed tip of the pouring device and therefore before the granular material has been emptied.

The bonding strength depends on the type of the adhesive and on the bonding surface of the shoulder, as explained hereinabove.

INDUSTRIAL APPLICABILITY

The pouring device has a particular application in the emptying of a vacuum-sealed package containing active dry yeast, for example, in beer production, and more specifically to ensure the aseptic transfer of dry brewer's yeast into a fermentation tank from the yeast contained in the package.

In the field of beer production, it provides noteworthy progress by limiting the risks of contamination inside the fermentation tank when the yeast is poured into the tank from a vacuum-sealed package.

LIST OF REFERENCE SIGNS

1: Manual pouring device,
2. Tubular body,
20. Duct,
21. Inlet opening,
22. Outlet opening,
23. Inside threads,
3. Piercing tool,
30. Pointed tip,
31. Widened base,
32. Lateral opening,
33. Ogive arches,
330. Ridge (ogive arch bevel),
331, 332. Sloped surfaces,
4. Shoulder,
5. Grip handle,
51. Wrist strap,
52. Eyelet (wrist strap attachment)
53. Rim,
6. Cover,
60. Sealed chamber,
7. Production unit, such as a fermentation unit,
70. Enclosure, such as a fermentation tank,
71. Pipe,
A. Longitudinal axis of the piercing tool 3,
Ad Adhesive,
d1, d2. First direction and second direction,
F. Outside threads,
Fp. Peelable sheet,
P. Package,
S1. First adhesive surface (double-sided adhesive),
S2. Second adhesive surface (double-sided adhesive),
Rint, Rext. Inner and outer radii of the bonding surface formed by the shoulder 4,
Sc. Flat bonding surface (shoulder 4),
T. Adhesive hole.

The invention claimed is:

1. A manual pouring device suitable for piercing and emptying a granular material contained in a vacuum-sealed package, comprising:

a tubular body, having a duct for the flow of the material, extending from an inlet opening positioned at a first end of the tubular body to an outlet opening for the granular material, positioned at a second end of the tubular body, a hollow piercing tool having a distal end ending in a pointed tip and a widened base at the proximal end thereof, rigidly connected to the tubular body at the first end of the tubular body, the piercing tool having at least one lateral opening along the length of the piercing tool, said lateral opening extending along the length of the piercing tool from the widened base of the piercing tool, said lateral opening being configured to allow the material to be poured from the outside to the inside of the hollow portion of the piercing tool, the hollow portion of the widened base of the piercing tool being in communication with the inlet opening of the tubular body, a shoulder serving as a peripheral stop, formed by the first end of the tubular body arranged around the widened base of the piercing tool, said shoulder serving as a stop being configured to come into contact with the wall of the package directly or indirectly to stop the pouring device when said wall is pierced by the piercing tool in a position in which said lateral opening extends to the inside of the package and wherein said pouring device is configured to ensure the continuous emptying of the contents of the vacuum-sealed package when the pouring device is oriented vertically, the pointed tip pointing upward, the granular material flowing by gravity through said lateral opening via the inlet opening and to the outlet opening by gravity in the opposite direction of air entering the package, wherein the tubular body has dimensions configured to form a grip handle for a hand, the pouring device having a wrist strap rigidly connected to the grip handle, through which the user's hand is intended to pass when the hand grips the grip handle.

2. The manual pouring device according to claim 1 wherein the piercing tool has a longitudinal axis, said shoulder has a flat surface substantially perpendicular to said longitudinal axis, configured to serve as a bonding surface with an adhesive on the outside wall of the package.

3. The manual pouring device according to claim 2, wherein the flat surface serving as a bonding surface has a surface area usable for bonding of between 3 $cm^2$ and 50 $cm^2$.

4. The manual pouring device according to claim 3, wherein the surface area usable for bonding has an annular shape, defined between an outer radius and an inner radius.

5. The manual pouring device according to claim 4, wherein the difference in radius AR between the outer radius and the inner radius is between 2 mm and 20 mm.

6. The manual pouring device according to claim 2, wherein the widened base of the piercing tool has, in a plane perpendicular to the longitudinal axis thereof, a longer dimension in a first direction and, in a substantially perpendicular second direction a shorter dimension, and wherein the surface area usable for bonding extends along the trajectory of an oval consisting of a closed curve elongated in the first direction and narrow in the second direction.

7. The manual pouring device according to claim 2, wherein the tubular body has a longitudinal axis that is substantially the same as the longitudinal axis of the piercing tool.

8. The manual pouring device according to claim 1, wherein the useful length of the tubular body serving as a handle is between 8 cm and 15 cm.

9. The manual pouring device according to claim 1, wherein the outside diameter of the useful surface forming a grip handle is between 2 cm and 5 cm.

10. The manual pouring device according to claim 1, essentially consisting of a single integral part made of plastic material forming the piercing tool and the tubular body, including the shoulder.

11. A method to transfer dry brewer's yeast into a fermentation tank, comprising providing the pouring device of claim 1, and applying the pouring device to pierce and empty the vacuum-sealed package containing the dry brewer's yeast.

12. Method for cleaning and disinfecting inside surfaces of a piercing tool and of a duct of a tubular body, and outside surfaces of the piercing tool of a pouring device of an equipment item, the pouring device as well as a cover of the pouring device suitable for piercing and emptying a granular material contained in a vacuum-sealed package, the pouring device comprising a tubular body, having a duct for the flow of the material, extending from an inlet opening positioned at a first end of the tubular body to an outlet opening for the granular material, positioned at a second end of the tubular body, a hollow piercing tool having a distal end ending in a pointed tip and a widened base at the proximal end thereof, rigidly connected to the tubular body at the first end of the tubular body, the piercing tool having at least one lateral opening along the length of the piercing tool, said lateral opening extending along the length of the piercing tool from the widened base of the piercing tool, said lateral opening being configured to allow the material to be poured from the outside to the inside of the hollow portion of the piercing tool, the hollow portion of the widened base of the piercing tool being in communication with the inlet opening of the tubular body, a shoulder serving as a peripheral stop, formed by the first end of the tubular body arranged around the widened base of the piercing tool, said shoulder serving as a stop being configured to come into contact with the wall of the package directly or indirectly to stop the pouring device when said wall is pierced by the piercing tool in a position in which said lateral opening extends to the inside of the package and wherein said pouring device is configured to ensure the continuous emptying of the contents of the vacuum-sealed package when the pouring device is oriented vertically, the pointed tip pointing upward, the granular material flowing by gravity through said lateral opening via the inlet opening and to the outlet opening by gravity in the opposite direction of an air entering the package and wherein the cover is sealingly cooperating with the first end of the tubular body, covering the piercing tool while forming a sealed chamber for a fluid, said chamber being defined between the cover, on the one hand, and the piercing tool and the shoulder, on the other hand, said sealed chamber communicating with the duct of the tubular body via said at least one lateral opening, the method comprising:

putting the cover in place covering the piercing tool and said shoulder, thereby forming a sealed chamber for a fluid, said chamber being defined between the cover, on the one hand, and the piercing tool and said shoulder, on the other hand, said sealed chamber communicating with the duct of the tubular body via said at least one lateral opening, and injecting a disinfectant fluid through the outlet opening so that the disinfectant fluid flows, on the one hand, into the duct and the hollow portion of the piercing tool and comes into contact with the inside walls of the duct and of the hollow portion of the piercing tool, and flows, on the other hand, into the sealed chamber while coming into contact with the outside walls of the piercing tool and of the shoulder.

13. The method according to claim 12, implemented in an equipment item comprising a pouring device of a production unit comprising an enclosure and the pouring device, the pouring device being rigidly mounted on the enclosure or a pipe of said production unit, the piercing tool oriented vertically, the pointed tip pointing upward, said pouring device being configured to transfer a granular material contained in a vacuum-sealed package to the enclosure, directly into said enclosure or indirectly via said pipe, wherein the step of injecting disinfectant fluid to disinfect the inside surfaces of the piercing tool and the duct of the tubular body of the pouring device, and the outside surfaces of the piercing tool and the shoulder, is an injection that simultaneously cleans the inside surfaces of the production unit.

14. A pouring device suitable for piercing and emptying a granular material contained in a vacuum-sealed package, comprising:

a tubular body, having a duct for the flow of the material, extending from an inlet opening positioned at a first end of the tubular body to an outlet opening for the granular material, positioned at a second end of the tubular body;

a hollow piercing tool having a distal end ending in a pointed tip and a widened base at the proximal end thereof, rigidly connected to the tubular body at the first end of the tubular body, the piercing tool having at least one lateral opening along the length of the piercing tool, said lateral opening extending along the length of the piercing tool from the widened base of the piercing tool, said lateral opening being configured to allow the material to be poured from the outside to the inside of the hollow portion of the piercing tool, the hollow portion of the widened base of the piercing tool being in communication with the inlet opening of the tubular body; and a shoulder serving as a peripheral stop, formed by the first end of the tubular body arranged around the widened base of the piercing tool, said shoulder serving as a stop being configured to come into contact with the wall of the package directly or indirectly to stop the pouring device when said wall is pierced by the piercing tool in a position in which said lateral opening extends to the inside of the package and wherein said pouring device is configured to ensure the continuous emptying of the contents of the vacuum-sealed package when the pouring device is oriented vertically, the pointed tip pointing upward, the granular material flowing by gravity through said lateral opening via the inlet opening and to the outlet opening by gravity in the opposite direction of air entering the package, wherein the piercing tool has a longitudinal axis, said shoulder has a flat surface substantially perpendicular to said longitudinal axis, configured to serve as a bonding surface with an adhesive on the outside wall of the package, and wherein the widened base of the piercing tool has, in a plane perpendicular to the longitudinal axis thereof, a longer dimension in a first direction and, in a substantially perpendicular second direction a shorter dimension, and wherein the surface area usable for bonding extends along the trajectory of an oval consisting of a closed curve elongated in the first direction and narrow in the second direction.

* * * * *